United States Patent Office 3,143,511
Patented Aug. 4, 1964

3,143,511
HYDROCRACKING OF PARAFFINS
John A. Bichard, Point Edward, Ontario, and Roger M. Butler and Noel J. Gaspar, Sarnia, Ontario, Canada, assignors to Esso Research and Engineering Company, a corporation of Delaware
No Drawing. Filed Apr. 20, 1960, Ser. No. 23,366
4 Claims. (Cl. 252—466)

This invention relates to a platinum impregnated alumina reforming and hydrocracking catalyst improved in its activity for selective hydrocracking of $C_5+$ paraffins by addition of an outer surface deposition of a metal having a specific cracking effect, e.g., preferably ferromagnetic iron; also, to the use of such a catalyst for obtaining more valuable anti-knock gasoline products and gaseous hydrocarbons, particularly $C_3$ and $C_4$ paraffins.

Platinum impregnated porous alumina has been known to be a prominently good catalyst for reforming or hydroforming naphthene-containing naphthas but has been found to have shortcomings in converting paraffins, particularly $C_5+$ normal paraffins, to higher anti-knock gasoline components. Accordingly, measures have been proposed for removing such paraffins from the hydroforming feed and from the hydroformate products. Other steps have been proposed for increasing the intensity of the hydroforming conditions to convert the paraffins but with increased severity of conditions there are drawbacks in damage to the catalyst, increased carbon deposition, and other difficulties of operation.

It has also generally been considered desirable to keep the platinum-alumina catalyst free of various other metals to obtain good hydroforming activity. Accordingly, certain research workers found that this kind of catalyst should be formed and kept free of contaminating metal compounds, even using high-purity adsorptive aluminas as supports.

In the discovery of the present invention, a definite addition of ferromagnetic iron as an outer surface deposition on platinum impregnated alumina reforming catalyst was found to keep the naphthene-dehydrogenation activity of the catalyst undiminished for producing aromatic hydrocarbons and for imparting to the catalyst a substantially improved selective paraffin hydrocracking activity.

By the description—outer surface deposition—is meant a thin adherent coating on the visible exterior surface of the alumina in contrast to internal impregnation in which the pores of the alumina are made to contain a metal or substance. The outer surface deposition may also be described as a skin impregnation or shell deposition on the catalyst pellets.

The platinum impregnated alumina reforming catalysts to which the present invention applies are in general known to contain usually 0.1 to 2 wt. percent of platinum deposited in pores of an alumina of the gamma type as it is designated in "Alumina Properties," by A.S. Russell, Aluminum Company of America (1953). Such an alumina is a transition phase, e.g., eta and gamma. A highly pure eta or mixed eta and gamma alumina is obtained by hydrolysis of aluminum alcoholate, as described in U.S. Patent 2,796,326. The alumina, before or after calcining, is impregnated with platinum, e.g., a halogen-containing platinum compound. The catalyst preferably contains a halogen, usually combined chlorine, as from treatment of the alumina, from the impregnating platinum compound, and from activation or regeneration treatment by the halogen in the presence of an oxidizing agent.

Although the chlorine or halogen has a hydrocracking effect in the catalyst under hydroforming conditions, it is limited with respect to $C_5+$ paraffins and not as selective as desired. For that reason, the use of high halogen content catalyst to accomplish hydrocracking has been proposed to be used especially in an added reaction zone where the paraffin concentration is increased, the naphthene content is low, and reforming conditions are more stringent. This use of a added hydrocracking stage following an aromatization stage is a precaution to prevent interference of non-selective hydrocracking with the aromatization of naphthenes.

In contrast to the use of simply chlorine or other halogen for promoting hydrocracking by a platinum-alumina catalyst, the outer surface ferromagnetic deposit can be used on the platinum-alumina catalyst for selective hydrocracking in the aromatization zone or in a single hydroforming stage.

Reforming or hydroforming involves dehydrogenation, isomerization, and hydrogenation of olefins formed. Hydrocracking, more particularly, is the breaking of carbon-to-carbon bonds, causing fragmenting of the hydrocarbon molecules, and involves hydrogenation of double bonds. Hydrocracking occurs under the same conditions as used in hydroforming. The $C_5+$ hydrocarbon feed stocks that participate in the reactions are usually naphtha fractions boiling in the range of 90° to 450° F. Wider or narrower boiling fractions may be used.

The reaction conditions suitable for use in the practice of the present invention are those known for hydroforming, e.g., temperatures of 800° to 1050° F., pressures of 50 to 1000 p.s.i.g., hydrogen dilution of up to 10,000 standard cubic feet per barrel of feed, and space velocities of 0.5 to 4 w./w./hr. (weight of feed per weight of catalyst per hour). These conditions can be varied with the feed and other requirements. The platinum impregnated alumina catalyst may be prepared in a conventional manner, e.g., as described in U.S. Patent 2,796,326.

The outer surface deposition of magnetic iron or other metals having specific catalytic cracking activity on a platinum impregnated alumina catalyst is achieved by several methods.

In one method, the platinum impregnated alumina catalyst after heating to a temperature in the range of 500° to about 950° F. is contacted with wet gas, such as nitrogen or air containing a limited amount of moisture and with gas containing $FeCl_3$ vapor or other hydrolyzable metal compound to obtain a surface deposition of the metal compound on the alumina. The catalyst is heated further to about 600° F. and moist air is passed over the catalyst to complete hydrolysis. At the same time, the temperature of the catalyst is raised to about 950° F. as volatile decomposition products from the hydrolysis are given off with little loss of the metal. In using this method in which gases carry the metal compound into contact with the alumina from a preceding vaporizing zone, it is important to prevent impregnation of the inner pores of the alumina. For instance, carrying out this method under anhydrous conditions in contacting the vaporized iron salt with the alumina, the catalyst was found to become largely or completely impregnated and thereby deactivated.

The internal impregnation of the alumina can be seen by visual inspection, e.g., the presence of yellowish-brown nonmagnetic iron oxide dispersed throughout the catalyst pellet. Treatment of a surface impregnated catalyst with HCl removes iron in accordance with the following reaction:

$$Fe_2O_3 + 6HCl \rightarrow 2FeCl_3 + 3H_2O$$

But internal impregnation occurs, particularly in a dry system. Only a very small amount of iron is internally dispersed throughout the catalyst pellet after the HCl treatment; this iron is extremely difficult and perhaps impossible to remove. The resulting catalyst is almost completely deactivated.

Another method for obtaining outer surface deposition of the metal involves the following procedure. The platinum impregnated alumina is heated with dry air (or dry $N_2$) at 600° F. to remove excess surface water. This step is important to avoid too rapid hydrolysis of $FeCl_3$ in the subsequent operation. The catalyst with excess surface water removed is cooled to below 500° F., which is below the melting point of $FeCl_3$, and mixed well with a measured amount of anhydrous $FeCl_3$. The catalyst thus mixed is then heated to about 600° F. (above the vaporization temperature of $FeCl_3$) until $FeCl_3$ vaporizes. Then air saturated with water is passed over the catalyst until no further HCl comes off. The hydrolysis reaction is represented by the following equation:

$$2FeCl_3 + 3H_2O \rightarrow Fe_2O_3 + 6HCl$$

During the hydrolysis the temperature is raised to 950° F.

Carrying out the procedure described, very little loss of iron occurred. The catalyst pellets were observed to have an outer surface deposition or skin impregnation varying up to about 25% thickness of the pellets, this thickness from a thin coating to about 1 mm., being recognized by a brown nonmagnetic $Fe_2O_3$ area at the surface of the pellets or pills which have a thickness or diameter of about 4 to 8 mm.

After obtaining the outer surface deposition or skin impregnation the nonmagnetic deposit is converted to a magnetic form of the metal by reduction. This reduction to the magnetic form can be carried out by treatment with hydrogen under suitable reducing conditions, e.g., temperatures of about 600° to 950° F. The reduction may also be made to take place in a hydroforming zone but this of course means a loss of effectiveness until the magnetic deposit is formed under the hydroforming conditions.

Test results have shown that the specific cracking effect of the ferromagnetic surface deposit is obtained with catalysts given an iron content of about 0.1 up to about 5 wt. percent. The ferromagnetism of the surface deposit is correlated to the activity for the specific cracking effect on $C_5+$ paraffins. There are several forms of iron which are ferromagnetic, e.g., metallic iron (alpha Fe), magnetite ($Fe_3O_4$), a number of iron carbides, iron nitrides, and iron carbon nitrides. Thus, the ferromagnetic iron deposit may be in a number of forms but most likely is in the form of the metallic iron with perhaps some lower iron oxides, e.g. $Fe_3O_4$.

By scraping off the iron containing shell from the catalyst pellets after use of the catalysts under reforming conditions and by making an X-ray analysis of the scraping of the iron shell, a very distinct pattern for alpha Fe was obtained. No other pattern, except that of the alumina was observed in the base. A distinct X-ray pattern for $Fe_3O_4$ was not obtained in analyzing the material from the shell. Thus, the reduced metal, iron, was the probable active component in the surface shell of the catalyst. The fact that the catalyst fully impregnated is permanently deactivated indicates that in such impregnation the iron becomes associated with the platinum in the interior of the pellets.

The normal reforming reactions such as dehydrocyclization and isomerization proceed evidently in the interior of the pellets where small crystals or crystallites of platinum are present. The specific cracking effect from the iron crystals on the outer surface of the alumina evidently proceeds simultaneously on the $C_5+$ paraffins entering or leaving through the outer surface of the pellet. Thus the catalyst having platinum dispersed in its interior and the magnetic iron crystals at the outer surface of the pellet has several functions, the cracking function being superimposed and independent of the other normal reforming functions of the catalyst. The idea of obtaining the specific cracking effect with limited surface impregnation of the alumina base can be extended to the use of other metals, e.g., non-noble metals of Groups VI and VIII of the Periodic Table and other metals which are paramagnetic. For instance, nickel and cobalt, as well as iron, their oxides and mixtures thereof have shown specific catalytic cracking effects on $C_5+$ paraffins for splitting their C—C bonds and they are thus useful to advantage in a surface impregnation of porous alumina containing a noble metal, e.g. Pt or Pd impregnated in its inner pores. However, iron or ferromagnetic deposits were found to excel in this function when the proper precautions are used to prevent internal impregnation of the catalyst pellets by such deposits.

Catalysts contaminated by small amounts of iron present in platinum or in the interior of the alumina and catalysts by substantial impregnation with iron salts do not give the desired hydrocracking effect but deactivate the reforming properties of the catalyst. For example, impregnation of the platinum-alumina catalyst by soaking in iron salt solutions followed by heating and drying at activating temperatures lowers the reforming activity. Iron scale is detrimental rather than beneficial. The difference in catalyst activity depending on the method of impregnation of a platinum-alumina catalyst by iron is brought out in the following comparative data.

TABLE 1

*Internal Impregnation vs. Skin Impregnation of Platinum Impregnated Alumina*

[Conditions: 300 p.s.i.g., 3 w./w./hr., 950° F., 6M s.c.f./b. Recycle Gas. No Drying. $Cl_2$ treating to break-through. 160–320° F. Venezuelan naphtha, 0.6 wt. percent Pt in adsorptive alumina]

| Method of Iron Impregnation | Internal | | | Skin | |
|---|---|---|---|---|---|
| Iron Content, Wt. percent | 3.2 | 4.0 | 4.5 | 4.8 | 1.5 |
| Run No | M-21 | M-22 | M-25 | M-24 | M-23 |
| Run, Hours | 6-9 | 1.5-4 | 1.5-4.5 | 1.5-4 | 1.5-4.5 |
| Research O.N., Clear | 72.2 | 69.7 | 73.4 | 95.4 | 95.9 |
| $C_5+$ Gasoline, Vol. Percent on Feed | 90.0 | 92.2 | 94.1 | 82.3 | 83.7 |

The results shown in the foregoing table illustrate how the internal impregnation with iron makes the catalyst unsuitable for obtaining a high octane number gasoline product. The $C_5+$ gasoline yield is a high vol. percent based on the feed where the octane number is low on account of the high $C_5+$ paraffin content of the gasoline. In the runs using the catalyst completely impregnated with iron, an average yield of about 92 vol percent $C_5+$ gasoline at an average octane number of about 71 was obtained. The yield at 71 octane number for a skin impregnated catalyst was 96.5 vol. percent. Thus, the completely impregnated catalyst had poor selectivity and low activity.

The amount of iron in the skin impregnated catalyst giving the selective cracking effect on the $C_5+$ may be as low as 0.1 wt. percent of the catalyst composite and may range upwardly to 5 wt. percent or more of the composite. Tests show that the preferred iron content of the skin impregnated catalyst is about 1.5 wt. percent and in the range of 0.1 to 5.0 wt. percent of the composite. This is shown in Table 1 by comparison of the skin impregnated catalyst 4.8 wt. percent and 1.5 wt. percent iron. In making the iron content substantially in excess of 5 wt. percent there is a tendency toward excessive impregnation and internal impregnation.

The following example illustrates further the desirability of using a suitable amount of iron in impregnating the outer surface of the catalyst.

EXAMPLE 1

Comparative runs were made on a virgin naphtha feed of 160° to 310° F. boiling range containing 12 vol. percent aromatics, 46 vol. percent naphthenes and 42 vol. percent paraffins. One platinum impregnated alumina catalyst was skin impregnated with 0.06 wt. percent iron and the other was skin impregnated with 1.49 wt. percent iron. The naphtha feed diluted with 6,000 s.c.f./bbl. of the feed was contacted with the catalyst at a liquid space velocity of 1.3 wt. of liquid feed per same unit wt. of catalyst per hour at 908° F., 450 p.s.i.g. The catalyst was treated to contain 0.3 wt. percent chlorine. The significant results of the comparative tests are summarized in the following table.

TABLE 2

*Effect of Magnetic Iron on Catalyst in Hydrocracking of Paraffins*

|  |  |  | Δ |
|---|---|---|---|
| Hydroforming Catalyst, Alumina Base.. | 0.6 Wt. percent Pt | | |
| Iron Content, Wt. percent | 0.06 | 1.49 | |
| Run No | I-18 | I-23 | |
| Run Hours | 14-17 | 10-16 | |
| Yields | | | |
| Aromatics, Vol. percent on Feed | 48.1 | 47.3 | |
| Naphthenes, Vol. percent on Feed | 5.1 | 5.3 | |
| $C_5+$ Paraffins, Vol. percent on Feed | 24.5 | 12.0 | −12.5 |
| $C_5+$ RON Clear | 95.7 | 98.1 | +2.4 |
| Relative Catalyst Activity | 37 | 55 | |

DIFFERENCE IN PARAFFIN PRODUCTS

|  |  |  |  |
|---|---|---|---|
| Methane, Wt. percent on Feed | 1.1 | 1.0 | −0.1 |
| Ethane, Wt. Percent on Feed | 2.3 | 2.6 | +0.3 |
| Propane, Wt. Percent on Feed | 4.2 | 9.9 | +5.7 |
| Butanes, Vol. Percent on Feed | 10.5 | 19.8 | +9.3 |
| Pentanes, Vol. Percent on Feed | 9.3 | 7.3 | −2.0 |
| Hexanes, Vol. Percent on Feed | 8.9 | 4.7 | −4.2 |
| $C_7+$ Alkanes, Vol. Percent on Feed | 6.3 | 0 | −6.3 |

The Δ (difference) in values indicates improved antiknock value by lowering of paraffin content of the $C_5+$ product, better catalyst activity, with substantially increased yields of propane and butanes. The catalyst activity in terms of relative space velocity for equivalent yield of the same octane number product is higher for the skin impregnated catalyst of higher iron content.

The skin impregnated catalyst is particularly useful in locations where $C_3$ and $C_4$ gaseous hydrocarbons are products of premium value. It is useful where less reactor equipment is desired; although, if desired, this catalyst could be used in a series of reactors, e.g., in final stage reactors. It is useful for eliminating an operation of removing $C_5+$ paraffins from the hydroformate gasoline product to obtain higher octane number gasoline. This selective hydrocracking catalyst may be used for hydrocracking paraffins separated from hydroforming feeds or hydroformates. It is useful for hydrocracking virgin or synthetic paraffinic feeds that boil in the range of 90° F. to 700° F. or higher.

The paraffin product analyses indicates that the platinum on alumina catalyst is useful for cracking high boiling paraffins, present in higher boiling fractions, e.g., heating oils and gas oils containing $C_{10}$ to $C_{20}$ paraffins The catalyst through its effects of cracking paraffinic chains may be used to break down $C_5+$ alkyl side chains of cyclic hydrocarbons.

Although the skin impregnated platinum alumina catalyst is shown to contain chlorine, tests have shown that simply varying the chlorine content of the platinum-alumina catalyst does not make the alteration in the paraffins obtained with the outer surface deposit of iron. For example, with an increased chlorine content but no treatment for adding Fe by skin impregnation, the platinum on alumina catalyst in hydroforming may form more low boiling paraffin products under hydrocracking conditions but it does not form particularly more $C_3$ and $C_4$ paraffins through cracking of $C_5+$ paraffins. On the other hand, increased addition of iron to the outer surface of the catalyst from a low amount to an optimum amount causes significant cracking of $C_5+$ paraffins to form increased amounts of $C_3$ and $C_4$ paraffins. Moreover, from analyses made, a treatment of the skin impregnated catalyst with chlorine, as in preparation of the catalyst or in the regeneration and rejuvenation (treatment with air or oxygen-containing gas and chlorine) does not significantly alter the chlorine content of the catalyst having the outer surface deposit of iron.

Analyses of used magnetic catalyst pills, skin impregnated with ferromagnetic deposits have shown 0.2 to 0.6 wt. percent platinum, 0.1 to 1.0 wt. percent chlorine, 0.1 to 5.0 wt. percent iron, about .05 wt. percent carbon, about 0.2 wt. percent sulfur and surface areas of about 200 to 250 m.²/gm.

Particularly important effects of the platinum impregnated alumina catalysts having the outer surface impregnation by iron or ferromagnetic substance considering hydroforming of a naphtha under the same hydroforming conditions are:

(a) Equivalent yields of aromatics.
(b) Lower $C_5+$ paraffin content of the hydroformate.
(c) Higher yields of propane and butanes.
(d) Higher octane number of the $C_5+$ hydroformate.
(e) Higher catalyst activity of the catalyst having the outer surface iron deposit.

At lower octane level hydroformate gasoline production, less cracking occurs, but the same general effect of the outer surface deposit of the iron in making more propane and butanes by cracking of the higher molecular weight paraffins can be observed. The net effect from this specific cracking action is that the $C_5+$ hydroformate has a higher content of aromatics from the reforming of the naphthenes and a lower content of $C_5+$ paraffins.

The invention described is claimed as follows:

1. A method of preparing a $C_5+$ paraffin hydrocracking catalyst which comprises contacting a platinum impregnated porous alumina hydroforming catalyst with ferric chloride vapor and with moisture in controlled amounts to form a hydrolyzed outer surface iron-containing deposit on the alumina, calcining the catalyst bearing said outer surface deposit to convert said deposit into nonmagnetic iron oxide and then reducing the outer surface deposit of nonmagnetic iron oxide to a metal magnetic deposit.

2. The method of claim 1, in which the ferric chloride vapor is contacted in an amount to make the iron content of the catalyst from 0.1 to about 5 wt. percent, said iron content being in the outer surface deposit.

3. A method of preparing a catalyst which comprises contacting a platinum impregnated porous alumina catalyst containing between about 0.1 and 5 wt. percent of platinum with ferric chloride vapor at a temperature between about 500° F. and 950° F. and a wet gas to obtain a surface deposition of the hydrolyzed metal compound on the catalyst, passing moist air over the catalyst to complete the hydrolysis of the ferric chloride and then raising the temperature to about 950° F. to remove volatile decomposition products from the catalyst.

4. A method of preparing a catalyst which comprises contacting a platinum impregnated porous alumina catalyst containing between about 0.1 and 5 wt. percent of platinum with ferric chloride vapor at a temperature between about 500° F. and 950° F. and moist air to hydrolyze the ferric chloride and then reducing the hydrolyzed iron compound to metallic iron.

References Cited in the file of this patent

UNITED STATES PATENTS

| 2,861,959 | Thorn et al. | Nov. 25, 1958 |
| 2,880,171 | Flinn et al. | Mar. 31, 1959 |
| 2,911,356 | Hanson | Nov. 3, 1959 |